(12) United States Patent
Kourtakis

(10) Patent No.: US 6,939,640 B2
(45) Date of Patent: Sep. 6, 2005

(54) ANODE ELECTROCATALYSTS FOR COATED SUBSTRATES USED IN FUEL CELLS

(75) Inventor: Kostantinos Kourtakis, Media, PA (US)

(73) Assignee: E. I. DuPont de Nemours and Company, Wilmington, DE (US)

( * ) Notice: Subject to any disclaimer, the term of this patent is extended or adjusted under 35 U.S.C. 154(b) by 277 days.

(21) Appl. No.: 10/245,662

(22) Filed: Sep. 17, 2002

(65) Prior Publication Data

US 2003/0059666 A1 Mar. 27, 2003

Related U.S. Application Data

(60) Provisional application No. 60/324,010, filed on Sep. 21, 2001.

(51) Int. Cl.$^7$ .............................. H01M 4/90; H01M 4/92
(52) U.S. Cl. ......................... 429/40; 429/44; 429/231.5
(58) Field of Search ............................ 429/40–42, 44, 429/231.5

(56) References Cited

U.S. PATENT DOCUMENTS

| | | | |
|---|---|---|---|
| 3,282,875 A | | 11/1966 | Connolly et al. |
| 3,346,421 A | | 10/1967 | Thompson et al. |
| 3,723,359 A | | 3/1973 | Borg et al. |
| 3,892,644 A | | 7/1975 | Borg et al. |
| 4,358,545 A | | 11/1982 | Ezzell et al. |
| 4,545,886 A | | 10/1985 | de Nora et al. |
| 4,716,087 A | * | 12/1987 | Ito et al. ........................ 429/40 |
| 4,794,054 A | * | 12/1988 | Ito et al. ........................ 429/44 |
| 5,051,156 A | | 9/1991 | Scharifker et al. |
| 5,217,821 A | * | 6/1993 | Landsman et al. ............ 429/13 |
| 5,484,666 A | | 1/1996 | Gibb et al. |
| 5,525,436 A | | 6/1996 | Savinell et al. |
| 5,547,551 A | | 8/1996 | Bahar et al. |
| 5,716,727 A | | 2/1998 | Savinell et al. |
| 6,025,085 A | | 2/2000 | Savinell et al. |
| 6,099,988 A | | 8/2000 | Savinell et al. |
| 6,110,333 A | | 8/2000 | Spethmann et al. |
| 6,245,214 B1 | | 6/2001 | Rehg et al. |
| 6,297,185 B1 | * | 10/2001 | Thompson et al. ......... 502/101 |

FOREIGN PATENT DOCUMENTS

| | | |
|---|---|---|
| EP | 84112538.8 | 10/1984 |
| JP | 60023977 | 7/1983 |

OTHER PUBLICATIONS

Gasteiger, Hubert A., Markovic, Nenad, Ross, Philip N. Jr. and Cairns, Elton J., CO Electrooxidation on Well–Characterized Pt–Ru Alloys, J. Phys. Chem., 1994, 98, 617–625.

Watanabe, Masahiro, Uchida, Makoto and Motoo, Satoshi, Preparation of Highly Dispersed Pt + Ru Alloy Clusters and the Activity for the Electrooxidation of Methanol, J. Electroanal. Chem. 229, (1987) 395–406, Elsevier Sequoia S.A., Lausanne.

Iwase, Masayoshi and Kawatsu, Shigeyuki, Optimized CO Tolerant Electrocatalysts for Polymer Electrolyte Fuel Cells, Electrochemical Society Proceeding Colume 95–23, p. 12–23.

Zawodzinki, Thomas A. Jr., CO Tolerance in PEFCs, Materials Science and Technology Division, Los Alamos National Laboratory, DOE Fuel Cells for Transportation Program, 1997.

Tarasevich, M. R., Zhutaeva, G. V. and Radyushkina, K. A., Nonmetallic Materials for Electrochemical Systems, Russian Journal of Electrochemistry, vol. 31, No. 10, 1995 pp. 1064–1076, MANK Hayka/Interperiodica Publishing.

Tikak, B. V., Ramamurthy, A. C. and Conway, B. E., High Performance electrode materials for the hydrogen evolution reaction from alkaline media$^§$, Proc. Indian Acad. Sci. (Chem. Sci.), vol. 97, Nos 3 & 4, Oct. 1986, pp 359–393, India.

* cited by examiner

*Primary Examiner*—Mark Ruthkosky

(57) ABSTRACT

Disclosed are electrocatalyst compositions useful for fuel cells comprising tungsten and molybdenum carbides and/or oxycarbides, or their mixtures in combination with noble metals, such as platinum and ruthenium; and a metal selected from the group consisting of V, Nb, Ta, Cr, Mn, Fe, Re, Co, Ni, Cu, and mixtures thereof.

16 Claims, No Drawings

ANODE ELECTROCATALYSTS FOR COATED SUBSTRATES USED IN FUEL CELLS

FIELD OF INVENTION

This invention relates to anode electrocatalysts for coated substrates such as catalyst coated membranes or coated gas diffusion backings that are used in making fuel cells. More particularly, this invention relates to anode electrocatalysts having enhanced CO tolerance or enhanced methanol electrooxidation activity.

BACKGROUND OF THE INVENTION

Fuel cells are devices that convert fuel and oxidant to electrical energy. Electrochemical cells generally include an anode electrode and a cathode electrode separated by an electrolyte. A well known use of electrochemical cells is in a stack for a fuel cell that uses a proton exchange membrane (hereafter "PEM") as the electrolyte. In such a cell, a reactant or reducing fluid such as hydrogen is supplied to the anode electrode, and an oxidant such as oxygen or air is supplied to the cathode electrode. The hydrogen electrochemically reacts at a surface of the anode electrode to produce hydrogen ions and electrons. The electrons are conducted to an external load circuit and then returned to the cathode electrode, while hydrogen ions transfer through the electrolyte to the cathode electrode, where they react with the oxidant and electrons to produce water and release thermal energy.

Most efficient fuel cells use pure hydrogen as the fuel and oxygen as the oxidant. Unfortunately, use of pure hydrogen has a number of know disadvantages, not the least of which is the relatively high cost, and storage considerations. Consequently, attempts have been made to operate fuel cells using other than pure hydrogen as the fuel.

For example, attempts have been made to use hydrogen-rich gas mixtures obtained from steam reforming methanol as a fuel cell feed. This may be particularly important for automotive applications, since a convenient source of hydrogen gas can be the steam reformation of methanol, since methanol can be stored more easily in a vehicle than hydrogen. However, it is known that methanol reformate gas can contain as much as 25% carbon dioxide ($CO_2$) and up to 1% carbon monoxide (CO), and the catalytic performance of pure platinum can be significantly reduced by the presence of even 10 parts per million (ppm) of CO.

Therefore, successful use of reformed hydrogen fuel depends upon either decreasing the CO content of the fuel or development of CO-tolerant anode electrocatalysts, or both.

One approach to avoid the effects of CO on polymer electrolyte fuel cell (PEFC) performance is described in U.S. Pat. No. 6,245,14B1, wherein several methods for reducing CO concentrations by several additional fuel processing steps (prior to introduction of the fuel to the fuel cell stack) are outlined. All suffer from the drawback of substantially increasing the cost and complexity of the entire fuel cell system.

Another method for removing or lowering CO in a reformate fuel mixture is the oxidation of CO to $CO_2$ at the anode by means of introducing air, typically 2% by volume, into the reformate hydrogen stream, as described in U.S. Pat. No. 4,910,099 ("air bleed method"). While this method is effective, it also introduces added complexity to the PEFC, and a loss of efficiency.

A further approach is to enhance the CO tolerance of the anode electrocatalyst in the PEFC. CO tolerance of Pt electrodes can be improved by alloying the electrocatalyst with a second element, preferably ruthenium (Ru) (see, for example, M. Iwase and S. Kawatsu, *Electrochemical Society Proceedings*, v. 95–23, p. 12; *Proceedings of the First International Symposium on Proton Conducting Membrane Fuel Cells*, S. Gottesfeld, et al., Eds., The Electrochemical Society, for a 1:1 atomic ratio alloy of Pt:Ru on a carbon support at Pt loading level of 0.4 mg/cm2, the fuel cell operating at 80° C. It is further known in the art (T. A. Zawodzinski, Jr, presented at Fuel Cells for Transportation, U.S. Department of Energy, National Laboratories, R &D Meeting, Jul. 22–23, 1997, Washington, D.C.) that a PEFC having a PtRu mass loading of 0.6 mg/cm2 operating at temperatures above 100° C. has been shown to be tolerant to 100 ppm CO. However, this method loses effectiveness at lower temperatures, and especially when lower loadings of the electrocatalyst are used.

In addition to CO tolerance at low temperatures, the use of CO tolerant electrocatalyst at a lower loading of electrocatalyst is needed. A low noble metal electrocatalyst loading would offer major advantages in cost, since noble metals comprise the majority of the cost in a typical noble metal based electrocatalyst system. Tungsten carbide is mentioned as a fuel cell catalyst component in U.S. Pat. No. 3,833,423. However, in this application, tungsten carbide is used as the sole ingredient in addition to covering it with other particles to provide autooxidation (degradation) of the electrocatalyst. The electrocatalytic activity for this system is very low.

WO 99/42213 discloses a catalyst comprising a support body comprised of a transition metal based electrically conductive ceramic, and at least one noble metal supported upon said support body. The transition metal based ceramic comprises a compound of at least one transition metal, the compound being selected from the group consisting of carbides, nitrides, borides, silicides and combinations thereof. In particular embodiments the ceramic may further include an oxide, oxycarbide or oxynitride therein. The noble metal may comprise a single metal, an alloy of metals, and one particularly preferred alloy comprises an alloy of alloy of platinum and molybdenum. Also disclosed as noble metals are Pt, Pd, Os, Ir, Ru, Ag, and Rh. The presence of an oxygen component, e.g., oxycarbide on the support diminishes the poisoning effects of CO poisoning on many noble metal catalysts.

Similarly, high surface area electrodes used in electrochemical energy storage devices comprising conductive transition metal nitrides, carbides and borides are disclosed in U.S. Pat. No. 5,680,292. The use of the pure materials are disclosed but not their composites with noble metals.

In an organic/air fuel cell an organic fuel such as methanol, formaldehyde, or formic acid is oxidized to carbon dioxide at an anode, while air or oxygen is reduced to water at a cathode. Fuel cells employing organic fuels are extremely attractive for both stationary and portable applications, in part, because of the high specific energy of the organic fuels, e.g., the specific energy of methanol is 6232 Wh/kg. One such fuel cell is a "direct oxidation" fuel cell in which the organic fuel is directly fed into the anode, where the fuel is oxidized. Thus the need for a reformer to convert the organic fuel into a hydrogen rich fuel gas is avoided resulting in considerable weight and volume savings for the fuel cell system.

Materials customarily used as anode electrocatalysts are pure metals or simple alloys (e.g., Pt, Pt/Ru, Pt/Ni) supported on high surface area carbon. For example, the state-of-the-art anode catalysts for hydrocarbon (e.g., direct methanol) fuel cells are based on platinum (Pt)-ruthenium (Ru) alloys. Heretofore, the best known catalyst was $Pt_{50}/Ru_{50}$ (numbers in subscript indicate atomic ratios). Gasteiger et al., *J Phys. Chem,* 98:617, 1994; Watanabe et al., *J ElectroanaL Chem.,* 229:395, 1987. These known catalysts do not provide the required methanol oxidation to make them function effectively in fuel cells.

A need exists for fuel cell anode electrocatalysts that are tolerant to the high CO content of a CO-containing hydrogen rich gas mixture, thus minimizing the need for additional CO clean-up or abatement steps prior to the use of this fuel in a fuel cell stack. Fuel cell anode electrocatalysts containing a small amount of noble metal that render them less expensive than current anode electrocatalysts, at a comparable anode electrocatalyst loading, are also needed. A need also exists for improved catalysts that provide enhanced methanol oxidation in direct methanol fuel cells.

SUMMARY OF THE INVENTION

In a first aspect, this invention provides an anode electrocatalyst, comprising:

(a) compound selected from the group consisting of tungsten carbide, molybdenum carbide, tungsten oxycarbide, molybdenum oxycarbide, and mixtures thereof;

(b) platinum, mixtures of platinum and ruthenium, or mixtures of platinum and ruthenium oxide; and (c) a metal selected from the group consisting of V, Nb, Ta, Cr, Mn, Fe, Re, Co, Ni, Cu, and mixtures thereof.

In "reformer based" fuel cell systems, these anode electrocatalysts provide high CO tolerance. In direct methanol fuel cell systems these anode electrocatalysts provide enhanced activity for methanol oxidation.

In the first aspect, the invention typically further provides an anode electrocatalyst further comprising a catalyst solid support.

In a second aspect, the invention provides a coated substrate comprising a substrate having coated thereon an electrocatalyst coating composition, wherein the electrocatylst coating composition comprises an anode electrocatalyst comprising:

(a) compound selected from the group consisting of tungsten carbide, molybdenum carbide, tungsten oxycarbide, molybdenum oxycarbide, and mixtures thereof;

(b) platinum, mixtures of platinum and ruthenium, or mixtures of platinum and ruthenium oxide; and (c) a metal selected from the group consisting of V, Nb, Ta, Cr, Mn, Fe, Re, Co, Ni, Cu, and mixtures thereof.

In a third aspect, the invention provides a fuel cell comprising a coated substrate, wherein the coated substrate comprises a substrate having coated thereon an electrocatalyst coating composition, wherein the electrocatalyst coating composition comprises an anode electrocatalyst comprising:

(a) compound selected from the group consisting of tungsten carbide, molybdenum carbide, tungsten oxycarbide, molybdenum oxycarbide, and mixtures thereof;

(b) platinum, mixtures of platinum and ruthenium, or mixtures of platinum and ruthenium oxide; and (c) a metal selected from the group consisting of V, Nb, Ta, Cr, Mn, Fe, Re, Co, Ni, Cu, and mixtures thereof.

DETAILED DESCRIPTION OF THE INVENTION

Anode Electrocatalyst:

An anode electrocatalyst comprising:

(a) a compound selected from the group consisting of tungsten carbide, molybdenum carbide, tungsten oxycarbide, molybdenum oxycarbide, and mixtures thereof;

(b) platinum, mixtures of platinum and ruthenium, or mixtures of platinum and ruthenium oxide; and (c) a metal selected from the group consisting of V, Nb, Ta, Cr, Mn, Fe, Re, Co, Ni, Cu, and mixtures thereof.

By mixtures it is meant that the metals may be in separate phases, for e.g. crystallographic phases, or alloys of said metals. Oxides is meant to include all ruthenium oxygen stoichiometries, including hydrated ruthenium oxide phases.

Typically, component (a) may be present in the amount of about 5 to about 99.989995 mole %, more typically about 30 to about 99.989995 mole %, component (b) may be present in the amount of about $5 \times 10^{-6}$ to about 70 mole %, more typically $5 \times 10^{-6}$ to about 50 mole %, and the additional metal (c), such as a transition metal, may be present in the amount of about 0.01 to about 69.999995 mole %, or alternatively 0.01 to about 49.999995 mole %, where the mole percentages are calculated based on the total metals content. All mole fractions described are internal ratios, absent the solid support. The amount of carbon in the carbide compounds is present in a ratio of carbon: (Mo+W) in the atomic ratio ranging from about 0.5 to about 2.0.

The anode electrocatalyst of this invention can be either a particular structure, containing a desired ratio of cations, or a combination of structures that together contain the desired ratio of cations. The anode electrocatalyst may thus be a mixture of the crystalline oxides of the compound of the formula given above, and may further include the amorphous phase of the compound.

Catalyst Solid Support:

The anode electrocatalyst further comprises conventional catalyst solid supports including, but not limited to, various forms of turbostratic carbons or graphitic carbons. Typical supports are turbostratic or graphitic carbons such as Cabot Corporation's Vulcan® XC72R, Akzo Noble Ketjen® 600 or 300, as well as other conducting carbon varieties. The catalyst solid support provides a base for components (a) and (b). The catalyst solid support is present in the amount of 1 to 99.9 mole, more typically 6–98 mole %, based on the total mole % of the anode electrocatalyst in of the electrocatalyst composition containing the support.

Method of Preparation:

The anode electrocatalyst can be prepared by any method that results in a composition with the desired combination of elements. They include coprecipitation, impregnation, sol-gel techniques, aqueous or nonaqueous solution or suspension mixing, freeze drying, spray roasting, spray drying or dry mixing. Small or trace amounts of elements other than the desired elements may be present in the final composition. Ceramic methods, i.e., solid state techniques could be used, but are, in general, less preferred. Certain of the compounds are better prepared by one method rather than another as appreciated by one of ordinary skill in the art.

The anode electrocatalyst may typically be prepared at normal atmospheric pressure, but elevated or reduced pressures may also be employed. Agitation is not required, but is usually provided to facilitate the preparation of a homogeneous mixture, and to facilitate heat transfer.

The anode electrocatalyst may be produced using the following steps:

(i) component (a) or optionally vanadium, niobium or tantalum carbides or oxycarbides may be prepared by first forming an oxygen containing precursor from inorganic salts, such as nitrates, chlorides, oxyhydroxides, or alkoxides, using processes such as freeze drying, spray drying, spray roasting, or sol gel processing. The oxygen containing precursors are heated in hydrocarbon/hydrogen gas mixtures, which may be present in the ratio of 1:10 to 10:1 to prepare the corresponding carbide phases at temperatures between 600 to 1200° C., more typically 700° C. and 900° C., for a period of 0.5 to 48 hours. Typically the hydrocarbon may be selected from the group consisting of ethane and methane;

(ii) Component (b) and (c) may be deposited on the carbide or oxycarbide containing materials produced from step (i) by chemically reducing the appropriate stoichiometric ratios of platinum or platinum and ruthenium chlorides, acetates, nitrates, or other inorganic salts thereof with hydrazine, hypophosphorous acid, sodium borohydride, oxalates, or other well known chemical reducing agents. Alternatively, this step may be accomplished by an oxidative process in which platinum chloride ($H_2PtCl_6$) is reacted with sodium hydrogen sulfite ($NaHSO_3$) to produce the divalent (H3Pt(SO3)2OH), which can be oxidized with a chemical oxidant such as $H_2O_2$ to produce a colloid or colloid mixture which can be deposited on to the materials of step (i) by reaction with chemical reducing agents outlined earlier as well as $H_2$ gas. $RuCl_3$ can be added simultaneously or sequentially after the Pt addition and oxidized to produce colloidal ruthenium oxide, and deposited with H2 gas.

Components (c) can also be introduced into the compound forming an ink of the powder produced in the previous steps with any soluble precursors of component (c) mixed with Nafion® ionomer solution. The ink can then be heated in a reducing environment over a temperature range of 150 to 500° C., typically 300° C. to produce the final catalyst.

This anode electrocatalyst may optionally be supported on conventional catalyst solid supports including, but not limited to, various forms of turbostratic carbons or graphitic carbons.

Several methods known in the art to prepare the supported anode electrocatalyst can be used. In one embodiment, the catalyst solid support may be introduced in step (i) of the process during freeze drying, spray drying, spray roasting, or sol gel processing.

Freeze drying procedures to produce the oxygen containing precursors in step (i) may be used if the inorganic salts, such as nitrates, chlorides, oxyhydroxides, are soluble in water or other solvent which can be rapidly frozen. These salts may be dissolved in an appropriate amount of solvent to form a solution or fine colloid. Solution concentrations may vary widely, and can range from 0.1 M to 10 M, depending on the solubility of the inorganic salts used. The solution may then be rapidly cooled and frozen(<<1 minute) by immersion in a suitable medium, such as liquid nitrogen. If the solution is rapidly frozen, the salts and other components will remain intimately mixed and will not segregate to any significant degree. The frozen solid may be transferred to a freeze drying chamber. The solution may be kept frozen while water vapor is removed by evacuation. Evacuation times may vary from day(s) to week(s), depending on the quantity of solvent to be removed. Refrigerated shelves may be used to prevent thaw-out of the frozen solids during evacuation.

Solutions of the inorganic salts prepared as described above and optionally the catalyst solid support may be spray dried by atomization of these liquids which may usually, but not exclusively, be aqueous, into a spray. Contact between the spray and drying medium, e.g. hot air, results in moisture evaporation. The drying of the spray proceeds until the desired moisture content in the dried particles is obtained, and the product may be recovered by suitable separation techniques such as cyclone separation. A detailed description of spray drying methods can be found in "Spray Drying Handbook", 4th edition by K. Masters (Longman Scientific and Technical, John Wiley and Sons, N.Y.) c. 1985.

Spray roasting also involves these same solutions or colloids, but generally involves drying and calcination (at higher temperatures) in one process step to produce the oxygen containing precursors of step (i).

The oxygen containing precursor described in step (i) may also be prepared by a sol gel process. In this case, the tungsten or molybdenum may be in a sol gel "matrix" derived from a number of alkoxides. For instance, one or more metal alkoxides (e.g., molybdenum or tungsten ethoxide) may be used as starting material for preparing the gels. The inorganic metal alkoxides used to prepare the anode electrocatalyst may include any alkoxide which contains from 1 to 20 carbon atoms, preferably 1 to 5 carbon atoms, in the alkoxide group. Typically, these alkoxides are soluble in the liquid reaction medium. $C_1$–$C_4$ alkoxides are most typical. Some examples of most typical $C_1$–$C_4$ alkoxides include tungsten or molybdenum ethoxide.

Water can be added to the non-aqueous solution of at least one alkoxide, typically selected from the group consisting of tungsten and molybdenum to induce a hydrolysis and condensation reaction of the alkoxides to form a gel. Alternatively, other water soluble components in the catalyst composition (for instance, nitrate salts of iron, manganese, nickel or cobalt) can be added to the non-aqueous alkoxide solution. The solution may be prepared in a moisture-free environment, preferably under inert conditions, for example a nitrogen blanket. It is also typical that the hydrolysis reactions that induce gel formation be performed under a moisture-free, inert-gas environment so that the hydrolysis can be controlled during the contacting step of the non-aqueous with the aqueous solutions. Typically, the amount of water added is chosen according to the hydrolysis stoichiometry. For pentavalent alkoxides such as ($Mo(OEt)_5$), a 5:1 water:molybdenum alkoxide ratio is typical. The material may be conventionally or supercritically dried to produce the oxygen containing precursors, which in this case are dried gels (xerogel) or aerogels. Other methods to prepare the supported anode electrocatalyst can be used. Component (a) or optionally vanadium, niobium or tantalum carbides or oxycarbides can be prepared by despositing alkoxides, nitrates, acetates, chlorides, ammonium tuntgstate or ammonium molyubdate or other soluble precursors of molybdenum, tungsten, niobium, or tantalum onto conducting solid supports. This can be acccomplished by incipient wetness techniques and direct impregnation. For instance, a carbon support can be charged first with water soluble precursors and water, which can optionally be frozen. Alkoxide reagents or other water reactive precursors containing additional components of (a) or optionally vanadium, niboium or tantalum can be added to this frozen solid and dry milled and warmed to room temperature. The mixture can then be reacted at higher temperatures to form component (a) or optionally vanadium, niobium or tantalum carbides or oxycarbides which are supported on a solid support. The materials can be heated in hydrocarbon/ hydrogen gas mixtures, which may be present in the ratio of 1:10 to 10:1 to prepare the corresponding carbide phases at temperatures between 600 to 1200° C., more typically 700° C. and 900° C., for a period of 0.5 to 48 hours. Typically the hydrocarbon is selected from the group consisting of ethane and methane. Components (b) and (c) can be subsequently deposited onto this material by chemically reducing the appropriate stoichiometric ratios of platinum or platinum and ruthenium chlorides, acetates, nitrates, or other inorganic salts thereof with hydrazine, hypophosphorous acid, sodium borohydride, oxalates, or other well known chemical reducing agents. Alternatively, this step may be accomplished by an oxidative process in which platinum chloride ($H_2PtCl_6$) is reacted with sodium hydrogen sulfite ($NaHSO_3$) to produce the divalent (H3Pt(SO3)2OH, which can be oxidized with a chemical oxidant such as $H_2O_2$ to produce a colloid or colloid mixture which can be deposited on to the materials of step (i) by reaction with chemical reducing agents outlined earlier as well as $H_2$ gas. $RuCl_3$ can be added simultaneously or sequentially after the Pt addition and oxidized to produce colloidal ruthenium oxide, and deposited with H2 gas. Components (c) can also be introduced into the compound forming an ink of the powder produced in the previous steps with any soluble precursors of component c mixed with Nafion® ionomer solution. The ink can then be heated in a reducing environment over a temperature range of 150 to 500 C, preferable 300 C to produce the final catalyst.

There are several other methods of preparing the carbide phases, onto which the noble metal components may be post-introduced. These include the direct reaction of metals and elemental carbon at elevated temperatures and the reaction of the metal oxides in the presence of solid carbon. Other methods include the formation of carbides through carbonyls and carbon containing organometallic compounds (for eg., molbydenum and tungsten carbonyl) which may be decomposed in inert atmospheres to produce the carbidic phases.

Another method for producing the carbide phases, prior to introduction of the noble metal, involves the formation of the carbides by reactive sputter deposition. Electrochemical methods may also be used to form the appropriate carbides.

Coated Substrate:

The coated substrate may comprise a catalyst coated membrane or a coated gas diffusion backing.

Catalyst Coated Membrane (CCM):

A variety of techniques are known for CCM manufacture which apply an electrocatalyst coating composition onto a substrate such as an ion exchange polymer membrane. Some known methods include spraying, painting, patch coating and screen printing.

Electrocatalyst Coating Composition:

Typically, the electrocatalyst coating composition comprises an anode electrocatalyst, a binder such as an ion exchange polymer, and a solvent. Since the ion exchange polymer employed in the electrocatalyst coating composition serves not only as binder for the electrocatalyst particles but also assists in securing the electrode to the membrane, it is preferable for the ion exchange polymers in the composition to be compatible with the ion exchange polymer in the membrane. Most typically, ion exchange polymers in the composition are the same type as the ion exchange polymer in the membrane.

Ion exchange polymers for use in accordance with the present invention are typically highly fluorinated ion-exchange polymers. "Highly fluorinated" means that at least 90% of the total number of univalent atoms in the polymer are fluorine atoms. Most typically, the polymer is perfluorinated. It is also typical for use in fuel cells for the polymers to have sulfonate ion exchange groups. The term "sulfonate ion exchange groups" is intended to refer to either sulfonic acid groups or salts of sulfonic acid groups, typically alkali metal or ammonium salts. For applications where the polymer is to be used for proton exchange as in fuel cells, the sulfonic acid form of the polymer is typical. If the polymer in the electrocatalyst coating composition is not in sulfonic acid form when used, a post treatment acid exchange step will be required to convert the polymer to acid form prior to use.

Typically, the ion exchange polymer employed comprises a polymer backbone with recurring side chains attached to the backbone with the side chains carrying the ion exchange groups. Possible polymers include homopolymers or copolymers of two or more monomers. Copolymers are typically formed from one monomer which is a nonfunctional monomer and which provides carbon atoms for the polymer backbone. A second monomer provides both carbon atoms for the polymer backbone and also contributes the side chain carrying the cation exchange group or its precursor, e.g., a sulfonyl halide group such a sulfonyl fluoride (—$SO_2F$), which can be subsequently hydrolyzed to a sulfonate ion exchange group. For example, copolymers of a first fluorinated vinyl monomer together with a second fluorinated vinyl monomer having a sulfonyl fluoride group (—$SO_2F$) can be used. Possible first monomers include tetrafluoroethylene (TFE), hexafluoropropylene, vinyl fluoride, vinylidine fluoride, trifluoroethylene, chlorotrifluoroethylene, perfluoro (alkyl vinyl ether), and mixtures thereof. Possible second monomers include a variety of fluorinated vinyl ethers with sulfonate ion exchange groups or precursor groups which can provide the desired side chain in the polymer. The first monomer may also have a side chain which does not interfere with the ion exchange function of the sulfonate ion exchange group. Additional monomers can also be incorporated into these polymers if desired.

Typical polymers include a highly fluorinated, most typically a perfluorinated, carbon backbone with a side chain represented by the formula —(O—$CF_2CFR_f$)$_a$—O—$CF_2CFR'_fSO_3H$, wherein $R_f$ and $R'_f$ are independently selected from F, Cl or a perfluorinated alkyl group having 1 to 10 carbon atoms, a=0,1 or 2. The typical polymers include, for example, polymers disclosed in U.S. Pat. No. 3,282,875 and in U.S. Pat. Nos. 4,358,545 and 4,940,525. One typical polymer comprises a perfluorocarbon backbone and the side chain is represented by the formula —O—$CF_2CF(CF_3)$—O—$CF_2CF_2SO_3H$. Polymers of this type are disclosed in U.S. Pat. No. 3,282,875 and can be made by copolymerization of tetrafluoroethylene (TFE) and the perfluorinated vinyl ether $CF_2$=CF—O—$CF_2CF$ ($CF_3$)—O—$CF_2CF_2SO_2F$, perfluoro(3,6-dioxa4-methyl-7-octenesulfonyl fluoride) (PDMOF), followed by conversion to sulfonate groups by hydrolysis of the sulfonyl fluoride groups and ion exchanging to convert to the acid, also known as the proton form. One typical polymer of the type disclosed in U.S. Pat. Nos. 4,358,545 and 4,940,525 has the side chain —O—$CF_2CF_2SO_3H$. This polymer can be made by copolymerization of tetrafluoroethylene (TFE) and the perfluorinated vinyl ether $CF_2$=CF—O—$CF_2CF_2SO_2F$, perfluoro(3-oxa-4pentenesulfonyl fluoride) (POPF), followed by hydrolysis and acid exchange.

For perfluorinated polymers of the type described above, the ion exchange capacity of a polymer can be expressed in terms of ion exchange ratio ("IXR"). Ion exchange ratio is defined as number of carbon atoms in the polymer backbone in relation to the ion exchange groups. A wide range of IXR values for the polymer are possible. Typically, however, the IXR range for perfluorinated sulfonate polymer is usually about 7 to about 33. For perfluorinated polymers of the type described above, the cation exchange capacity of a polymer is often expressed in terms of equivalent weight (EW). For the purposes of this application, equivalent weight (EW) is defined to be the weight of the polymer in acid form required to neutralize one equivalent of NaOH. In the case of a sulfonate polymer where the polymer comprises a perfluorocarbon backbone and the side chain is —O—$CF_2$—CF($CF_3$)—O—$CF_2$—$CF_2$—$SO_3H$ (or a salt thereof), the equivalent weight range which corresponds to an IXR of about 7 to about 33 is about 700 EW to about 2000 EW. A preferred range for IXR for this polymer is about 8 to about 23 (750 to 1500 EW), most preferably about 9 to about 15 (800 to 1100 EW).

The liquid medium for the electrocatalyst coating composition is one selected to be compatible with the process. It is advantageous for the medium to have a sufficiently low boiling point that rapid drying of electrode layers is possible under the process conditions employed, provided however, that the composition cannot dry so fast that the composition dries on the substrate before transfer to the membrane. When flammable constituents are to be employed, the selection should take into consideration any process risks associated with such materials, especially since they will be in contact with the catalyst in use. The medium should also be sufficiently stable in the presence of the ion exchange polymer that, in the acid form, has strong acidic activity. The liquid medium typically will be polar since it should be compatible with the ion exchange polymer in the electrocatalyst coating composition and be able to "wet" the membrane. While it is possible for water to be used as the liquid medium, it is preferable for the medium to be selected such that the ion exchange polymer in the composition is "coalesced" upon drying and not require post treatment steps such as heating to form a stable electrode layer.

A wide variety of polar organic liquids or mixtures thereof can serve as suitable liquid media for the electrocatalyst coating composition. Water in minor quantity may be present in the medium if it does not interfere with the coating process. Some typical polar organic liquids have the capability to swell the membrane in large quantity although the amount of liquids the electrocatalyst coating composition applied in accordance with the invention is sufficiently limited that the adverse effects from swelling during the process are minor or undetectable. It is believed that solvents with the capability to swell the ion exchange membrane can provide better contact and more secure application of the electrode to the membrane. A variety of alcohols are well suited for use as the liquid medium.

Typical liquid media include suitable $C_4$ to $C_8$ alkyl alcohols such as n-, iso-, sec- and tert-butyl alcohols; the isomeric 5-carbon alcohols such as 1,2- and 3-pentanol, 2-methyl-1-butanol, 3-methyl, 1-butanol, etc.; the isomeric 6-carbon alcohols, such as 1-, 2-, and 3-hexanol, 2-methyl-1-pentanol, 3-methyl-1-pentanol, 2-methyl-1-pentanol, 3-methyl, 1-pentanol, 4-methyl-1-pentanol, etc.; the isomeric C7 alcohols and the isomeric $C_8$ alcohols. Cyclic alcohols are also suitable. Preferred alcohols are n-butanol and n-hexanol. Most preferred is n-hexanol.

The amount of liquid medium in the anode electrocatalyst will vary with the type of medium employed, the constituents of the composition, the type of coating equipment employed, desired electrode thickness, process speeds etc. The amount of liquid employed is highly dependent on viscosity of the electrocatalyst coating composition that is very important to achieve high quality electrodes with a minimum of waste.

Handling properties of the electrocatalyst coating composition, e.g. drying performance, can be modified by the inclusion of compatible additives such as ethylene glycol or glycerin up to 25% by weight based on the total weight of liquid medium.

It has been found that the commercially available dispersion of the acid form of the perfluorinated sulfonic acid polymer, sold by E. I. du Pont de Nemours and Company under the trademark Nafion®, in a water/alcohol dispersion, may be used as starting material to prepare the electrocatalyst coating composition. Using this ion exchange polymer containing dispersion as base for the electrocatalyst coating composition, the anode electrocatalyst of the invention required to form an electrode can be added which yields a coating composition with excellent application properties.

In the electrocatalyst coating composition, it is preferable to adjust the amounts of anode electrocatalyst, ion exchange polymer and other components, if present, so that the anode electrocatalyst is the major component by weight of the resulting electrode. Most preferably, the weight ratio of anode electrocatalyst to ion exchange polymer in the electrode is about 2:1 to about 10:1.

Utilization of the known electrocatalyst coating techniques may produce a wide variety of applied layers which can be of essentially any thickness ranging from very thick, e.g., 20 µm or more very thin, e.g., 1 µm or less.

Substrate:

The substrate for use in preparing a catalyst coated membrane (CCM) may be a membrane of the same ion exchange polymers discussed above for use in the electrocatalyst coating compositions. The membranes may typically be made by known extrusion or casting techniques and have thicknesses which may vary depending upon the application, and typically have a thickness of 350 µm or less. The trend is to employ membranes that are quite thin, i.e., 50 µm or less. While the polymer may be in alkali metal or ammonium salt form, it is typical for the polymer in the membrane to be in acid form to avoid post treatment acid exchange steps. Suitable perfluorinated sulfonic acid polymer membranes in acid form are available under the trademark Nafion® by E. I. du Pont de Nemours and Company.

Reinforced perfluorinated ion exchange polymer membranes can also be utilized in CCM manufacture. Reinforced membranes may be made by impregnating porous, expanded PTFE (ePTFE) with ion exchange polymer. ePTFE is available under the tradename "Goretex" from W. L. Gore and Associates, Inc., Elkton Md., and under the tradename "Tetratex" from Tetratec, Feasterville Pa. Impregnation of ePTFE with perfluorinated sulfonic acid polymer is disclosed in U.S. Pat. Nos. 5,547,551 and 6,110,333.

Alternately, the ion exchange membrane may be a porous support for the purposes of improving mechanical properties, for decreasing cost and/or other reasons. The porous support may be made from a wide range of components, for e.g., hydrocarbons such as a polyolefin, e.g., polyethylene, polypropylene, polybutylene, copolymers of those materials, and the like. Perhalogenated polymers such as polychlorotrifluoroethylene may also be used. The membrane may also be made from a polybenzimadazole polymer. This membrane may be made by casting a solution of polybenzimadazole in phosphoric acid ($H_3PO_4$) doped with trifluoroacetic acid (TFA) as described in U.S. Pat. Nos. 5,525,436; 5,716,727, 6,025,085 and 6,099,988.

Coated Gas Diffusion Backing:

The gas diffusion backing comprises a porous, conductive sheet material such as paper or cloth, made from a woven or non-woven carbon fiber, that is treated to exhibit hydrophilic or hydrophobic behavior, and a gas diffusion layer, typically comprising a film of carbon particles and fluoropolymers such as PTFE. The electrocatalyst coating composition is coated thereon. The electrocatalyst coating composition which forms the anode or cathode is the same as that described earlier for the catalyst coated membrane.

Fuel Cell:

The fuel cell of the invention comprises a coated substrate, wherein the coated substrate comprises a substrate having coated thereon an electrocatalyst coating composition, wherein the electrocatalyst coating composition comprises a compound selected from the group consisting of tungsten carbide, molybdenum carbide, tungsten oxycarbide, molybdenum oxycarbide, and mixtures thereof; and platinum, mixtures of platinum and ruthenium, or mixtures of platinum and ruthenium oxide. The coated substrate may be a catalyst coated membrane or a coated gas diffusion backing.

Electrocatalysts in the anode and the cathode typically induce the desired electrochemical reactions. The fuel cells typically also comprise a porous, electrically conductive sheet material that is in electrical contact with each of the electrodes, and permit diffusion of the reactants to the electrodes. As described earlier, the electrocatalyst coating compositions may be coated on, an ion exchange membrane, to form an anode or cathode thereon, thereby forming a catalyst coated membrane. Alternatively, the electrocatalyst coating composition may be coated on a porous, conductive sheet material, typically known as a gas diffusion backing. The gas diffusion backings are normally made of woven or nonwoven carbon fiber substrates which are treated to affect the water wettability properties. The gas diffusion backing substrate may be coated on one or both surfaces with a thin porous layer containing carbon particles and a binder (usually PTFE), this layer is usually referred to as the "gas diffusion layer". The electrocatalyst coating composition may be coated on to the gas diffusion layer.

An assembly including the membrane, and gas diffusion backings with the electrocatalyst composition coated either on the membrane or the gas diffusion backings or on both, is sometimes referred to as a membrane electrode assembly ("MEA"). Bipolar separator plates, made of a conductive material and providing flow fields for the reactants, are placed between a number of adjacent MEAs. A number of MEAs and bipolar plates are assembled in this manner to provide a fuel cell stack.

For the electrodes to function effectively in these types of fuel cells, effective anode electrocatalyst sites must be provided. Effective anode electrocatalyst sites have several desirable characteristics: (1) the sites are accessible to the reactant, (2) the sites are electrically connected to the gas diffusion layer, and (3) the sites are ionically connected to the fuel cell electrolyte.

It is desirable to seal reactant fluid stream passages in a fuel cell stack to prevent leaks or inter-mixing of the fuel and oxidant fluid streams. Fuel cell stacks typically employ fluid tight resilient seals, such as elastomeric gaskets between the separator plates and membranes. Such seals typically circumscribe the manifolds and the electrochemically active area. Sealing is achieved by applying a compressive force to the resilient gasket seals.

Fuel cell stacks are compressed to enhance sealing and electrical contact between the surfaces of the separator plates and the MEAs, and sealing between adjacent fuel cell stack components. In conventional fuel cell stacks, the fuel cell stacks are typically compressed and maintained in their assembled state between a pair of end plates by one or more metal tie rods or tension members. The tie rods typically extend through holes formed in the stack end plates, and have associated nuts or other fastening means to secure them in the stack assembly. The tie rods may be external, that is, not extending through the fuel cell plates and MEAs, however, external tie rods can add significantly to the stack weight and volume. It is generally preferable to use one or more internal tie rods that extend between the stack end plates through openings in the fuel cell plates and MEAs as described in U.S. Pat. No. 5,484,666. Typically resilient members are utilized to cooperate with the tie rods and end plates to urge the two end plates towards each other to compress the fuel cell stack.

The resilient members accommodate changes in stack length caused by, for example, thermal or pressure induced expansion and contraction, and/or deformation. That is, the resilient member expands to maintain a compressive load on the fuel cell assemblies if the thickness of the fuel cell assemblies shrinks. The resilient member may also compress to accommodate increases in the thickness of the fuel cell assemblies. Preferably, the resilient member is selected to provide a substantially uniform compressive force to the fuel cell assemblies, within anticipated expansion and contraction limits for an operating fuel cell. The resilient member may comprise mechanical springs, or a hydraulic or pneumatic piston, or spring plates, or pressure pads, or other resilient compressive devices or mechanisms. For example, one or more spring plates may be layered in the stack. The resilient member cooperates with the tension member to urge the end plates toward each other, thereby applying a compressive load to the fuel cell assemblies and a tensile load to the tension member.

EXAMPLES

Example 1

Synthesis of the Catalyst Support Nb 1 wt % on Mo2C:

1.4823 g Nb(OCH$_7$)$_3$ are added to 50.0004 g MoO$_3$. Water is added to the above mixture to make a wet paste. This paste is well mixed with a spatula. The paste is dried in a drying oven for 1 hour at 110° C., with further drying in a vacuum oven at 110° C. overnight. 14.56 g of the above dried sample are placed into a vertical quartz tube and semifluidized in 500 SCCM N$_2$ at room temperature for 30 minutes. It is then switched to ~400 SCCM 10% ethane in H2 gas and heated to 700° C. at 1 C/min. The sample is reacted at 700° C. for 24 hours. The final product is passivated using 500 SCCM N$_2$/5SCCM O2 at room temperature for 4 hours. Final weight of the product is expected to be approximately 6.97 g.

Electrocatalyst Powder Synthesis:

2.37 g of the Nb 1 wt %/Mo$_2$C powder is used in this experiment.

44.68 g of hexachloroplatinic acid solution (Spectrum P1155, Pt 4.61 wt %) is mixed with 55.587 g RuCl$_3$.xH$_2$O (Aldrich 20,622–9) aqueous solution (Ru 1.92 wt %, determined by ICP elemental analysis). 70.13 ml liters of a 0.05 M aqeous solution of NH$_4$VO$_3$ is added, along with 7.97 ml of 0.44 M Mn (NO$_3$) hydrate and 3.5 ml of 1M Fe(NO$_3$)$_3$ solution. 2.37 g of 1% Nb/Mo$_2$C are added while stirring. Moisture is removed from this mixture by rapidly immersing the mixture in liquid nitrogen (thereby freezing the material to a solid). The solid mass is placed on a Virtis Freeze Drier and evacuated for >72 hours until dry. The final powder is reduced in hydrogen, to 300° C. for 1 hour in air.

0.0579 g of the above electrocatalyst powder, 0.1134 g of Nafion® ionomer Solution (10.62 wt %, SE10072, DuPont) and 5.83 g of H$_2$O are mixed and milled in an Omni Mixer Homogenizer at room temperature for 30 minutes. The ink is then coated onto carbon paper strips over a 1.5 cm$^2$ area so that the final loading of electrocatalyst is ca. 0.3 mg Pt/1.5 cm$^2$ to form Sample 1.

An Arbin Testing system station, manufactured by Arbin Instruments (Model BT2043, Software Version MITS'97) is used to collect the electrochemical half cell data. The electrodes are evaluated for their activity for methanol oxidation by using cyclic voltammetry (CV) in a 1M CH$_3$OH/0.5M H$_2$SO$_4$ solution using a 3 electrode system where the counter electrode is a Pt coil and a SCE (Standard calomel electrode) is used as the reference electrode. The potential is scanned from the open circuit potential (Eoc) to 1.1 V and back to −0.25V at a scan rate of 50 mV/sec. The scans are repeated from 1.1V−−0.25V−1.1V until the current is stable. The currents are normalized for geometric surface area. The current tabulated is ipt1A, which is the peak oxidation current from the CV scan normalized to the amount of Pt (in mg) on the catalyst strips.

The expected ipt1A value for this catalyst is >300 mA/mg Pt.

Example 2

A Ketjen 600 carbon supported catalyst was prepared using the following procedure:

Atomic ratios (mole %) of starting ingredients were as follows: 19.2 mole % of (31.6 mole % Pt, 31.6 mole % Ru, 1.1 mole % Nb, 10.8 mole % W, 8.3 mole % Fe, 9.4 mole % Mn, 7.32 mole % Re) 80.8 mole % C Step 1:

A "Waring" commercial blender was charged with 15.00 g of Ketjenblack 600 (Ketjen EC600 JD, Akzo Nobel) and 9.115 g of ammonium tungstate (Aldrich, 32, 238–5) that had been pulverized to a dust in a small micromill (Bel-Art Products, Pequanock, N.J., # 37252-0000). The mixture was chilled in dry ice for 90 minutes. 20.0 g of deionized water, which had been frozen in dry ice and pulverized in the micromill, were added to the blender and blended for about 2–4 minutes. The resulting uniform solid was allowed to warm slowly in a large crystallizing dish and then dried at approximately 50° C. overnight.

The material was returned to the Waring commercial blender and chilled in dry ice for 90 minutes. To the blender was added 1.029 niobium ethoxide (Nb(C2H5O)5, Aldrich, 33 920–2) in 18.0 g in cyclohexane, frozen in dry ice and pulverized in a micromill. The mixture was blended in the Waring commercial blender. The resulting uniform solid was allowed to warm slowly to room temperature in a large crystallizing dish and dried at room temperature (RT) for 48 hours. The product weight was 24.61 g.

7.17 grams of this material were loaded into a vertical quartz tube furnace (28 mm o.d.) fitted with a quartz frit. A gas was introduced at a flow rate of 100 sccm He and 200 sccm of a gas mixture consisting of 10 Ar, 45% H2, and 45% CH4 (methane). The sample was heated in this methane and hydrogen containing atmosphere at a rate of 10 C/min to 500° C. and 1 C/min to 800° C., and allowed to soak at 800° C. for 1 hour before cooling to room temperature in flowing He. The material was purged with nitrogen gas and then transferred to an inert atmosphere drybox where it was transferred and stored in nitrogen, with a product yield of about 5.93 g.

Powder x-ray diffraction data were obtained for the sample with a Philips X'PERT automated powder diffractometer, Model 3040. Samples were run in a batch mode with a Model PW 1775 multi-position sample changer. The diffractometer was equipped with an automatic variable slit, a zenon proportional counter, and a graphite monochromator. The radiation was CuK(alpha) (45 kV, 40 mA). Data was collected at room temperature from 4 to 80 deg. 2-theta; a continuous scan with an equivalent step size of 0.03 deg; and a count time of 2.0 sec. per step. Samples were prepared on silicon low background specimen holders as a thin layer of powdered material. The major crystalline phases were WC (card # 25–1041) and W$_2$C (card # 35–0726), as determined from reference samples from the JCPDS International Centre for Diffraction Data. Swarthmore Pa., 19081

Step 2:

A variation on the procedure from Watanabe, "M. Watanabe, M. Uchida, and S. Moto, "Preparation of Pt+Ru alloy clusters", *J. Electroanal. Chem.*, 229 (1987) 395–406 was used. Into a 5 liter stirred plastic vessel, 34.55 g of chloroplatinic acid solution (containing 10.13 wt % Pt in an aqueous solution derived from H$_2$PtCl$_6$, Sigma Aldrich Chemical Company, St. Louis, Mo.) were added along with 5000 ml of water. 17.65 g of NaHSO$_3$ were added (Aldrich Chemicals) and stirred into the solution for 10 minutes. The solution pH was adjusted to 5 using sodium carbonate. 858 ml of H$_2$O$_2$ (30 wt % H$_2$O$_2$, Merck, GaA, Darmstadt Germany) were added over a period of about four minutes, with pH controlled to about 5. 89.77 g of a RuCl$_3$ solution containing 2.02 wt % Ru (derived from RuCl$_3$, Sigma Aldrich Chemical Company) were diluted in 300 ml of H$_2$O. 4.12 g of the material prepared in Step 1 were added to the mixture, and the mixture was stirred for 15 minutes until the pH was stabilized. The material was stirred for 10 minutes under nitrogen and then purged with approximately 100 ml/minute hydrogen gas overnight at room temperature. It was filtered and washed with 5 liters of water, followed by air drying.

Step 3:

0.100 g of the material formed in Step 2, 0.454 g of 11.4 wt % of 990 EW Nafion® solution (SE10072, hydrogen form, DuPont, Wilmington, Del.) and 5.507 g of H$_2$O were mixed with 49.7 microliters of an aqueous 1M solution of FeNO$_3$ 9H$_2$O (prepared from FeNO$_3$ 9 H$_2$O from Aldrich, Chemicals), 112.9 microliters of an 0.44 M aqueous manganese nitrate solution (prepared from Mn(NO$_3$)$_2$ from Alfa, 878488), and 99.3 microliters of 0.5M aqueous perrhenic acid solution (prepared from perrhenic acid, Alfa, Aesar, 11339). This mixture was milled in an Omni Mixer Homogenizer at room temperature for 30 minutes. The ink was then coated onto carbon paper strips over a 1.5 cm$^2$ area so that the final of catalyst is ca. 0.3 mg Pt/1.5 cm$^2$. The electrode material was heated in hydrogen at 300° C. for 1 hour prior to testing.

Step 4:

An Arbin Testing system station, manufactured by Arbin Instruments (Model BT2043, Software Version MITS'97) was used to collect the electrochemical half cell data. The electrodes were evaluated for their activity for methanol oxidation by using cyclic voltametry (CV) in a 1M CH$_3$OH/ 0.5M H$_2$SO$_4$ solution using a three electrode system where the counter electrode was a Pt coil and a SCE (Standard calomel electrode) was used as the reference electrode. The potential was scanned from the open circuit potential (Eoc) to 1.1 V and back to −0.25V at a scan rate of 50 mV/sec. The scans were repeated from 1.1V−−0.25V−1.1V until the current was stable.

The currents were normalized for geometric surface area. The current tabulated was ipt1A, which was the peak oxidation current from the CV scan normalized to the amount of Pt (in mg) on the electrode Ipt1=339 mA/mg Pt

Example 3

A Ketjen 600 carbon supported catalyst was prepared using the following procedure:

Atomic ratios of (mole %) of starting ingredients were as follows: 5.9 mole % of (19.75 mole % Pt, 19.75 mole % Ru, 40.6 mole % Mo, 8.2 mole % Fe, 6.6 mole % Mn, 5.1 mole % Re), 94.1 mole % Ketjen Carbon Step 1:

A "Waring" commercial blender was charged with 15.00 g of Ketjen black 600 (Ketjen EC600 JD, Akzo Nobel, Houston, Tex.) and 5.66 grams of ammonium molybdate (Sigma, A-7302). 15.0 g of water were frozen in liquid nitrogen and pulverized in a small micromill (Bel-Art Products, Pequanock, N.J., # 37252-0000). The mixture of Ketjen black and ammonium molybdate was cooled using dry ice and added to the Waring commercial blender with the 15.0 g of frozen and pulverized water, and stirred for 2 minutes. The resulting uniform solid was allowed to warm slowly in a large crystallizing dish and then dried at approximately 120° C. for 4 hours.

7.27 grams of this material were loaded into a vertical quartz tube furnace (49 mm od) containing a glass frit, and fluidized with a gas mixture containing 100 sccm He and 200 sccm of a gas mixture consisting of 10 Ar, 45% $H_2$, and 45% $CH_4$ (methane). The sample was heated at a rate of 10° C./min to 500° C. and 1 C/min to 800° C., and allowed to soak at 800° C. for 1 hour before cooling to room temperature in flowing He. The material was purged with nitrogen gas and then transferred to an inert atmosphere drybox where it was transferred and stored in nitrogen, with a product yield of about 4.66 g.

Step 2:

A variation on the procedure from Watanabe, "M. Watanabe, M. Uchida, and S. Moto, "Preparation of Pt+Ru alloy clusters", *J. Electroanal. Chem.*, 229 (1987) 395–406 was used. Into a 5 liter stirred plastic vessel, 6.51 g of an aqueous chloroplatinic acid solution (containing 10.13 wt % Pt, derived from $H_2PtCl_6$, Aldrich Chemical Company) were added along with 969 ml of water. 3.324 g of $NaHSO_3$ were added (Aldrich Chemicals) and stirred into the solution for 10 minute. The solution pH was adjusted to 5 using sodium carbonate. 162 ml of $H_2O_2$ (30 wt % $H_2O_2$, Merck, GaA, Darmstadt Germany) were added over a period of about four minutes, with pH controlled to about 5. 16.87 g of an aqueous $RuCl_3$ solution containing 2.02 wt % Ru (derived from $RuCl_3$, Sigma Aldrich Chemical Company) were diluted in 56.5 ml of $H_2O$. 4.00 g of the material prepared in Step 2 were added to the mixture, and the mixture was stirred for 15 minutes until the pH was stabilized. The material was stirred for 10 minutes under nitrogen and then purged with approximately 100 ml/minute hydrogen gas overnight at room temperature. It was filtered and washed with 5 liters of water, followed by air drying.

Step 3:

0.101 g of the material formed in Step 2 and 0.0.177 g of 11.4 wt % 990 EW Nafion solution (SE10072, hydrogen form, DuPont, Wilmington, Del.) and 5.728 g of $H_2O$ were mixed with 20.0 microliters of an aqueous 1 M solution of $FeNO_3$ $9H_2O$ (prepared from $FeNO_3$ $9H_2O$ from Aldrich, Chemicals), 45.5 microliters of an aqueous solution consisting of 0.44 M Mn(NO3)2 (prepared from Mn(NO3)2 from Alfa, 878488), and 40.0 microliters of an aqueous solution of 0.5 M perrhenic acid (prepared from perrhenic acid, Alfa, Aesar, 11339. This mixture was milled in an Omni Mixer Homogenizer at room temperature for 30 minutes. The ink was then coated onto carbon paper strips over a 1.5 $cm^2$ area so that the final of catalyst is ca. 0.3 mg Pt/1.5 $cm^2$. The electrode material was heated in hydrogen at 300° C. for 1 hour prior to testing.

Step 4:

An Arbin Testing system station, manufactured by Arbin Instruments (Model BT2043, Software Version MITS'97) was used to collect the electrochemical half cell data. The electrodes were evaluated for their activity for methanol oxidation by using cyclic voltametry (CV) in a 1M $CH_3OH$/ 0.5M $H_2SO_4$ solution using a 3 electrode system where the counter electrode was a Pt coil and a SCE (Standard calomel electrode) was used as the reference electrode. The potential was scanned from the open circuit potential (Eoc) to 1.1 V and back to −0.25V at a scan rate of 50 mV/sec. The scans were repeated from 1.1V−−0.25V−1.1V until the current was stable.

The currents were normalized for geometric surface area. The current tabulated was ipt1A, which was the peak oxidation current from the CV scan normalized to the amount of Pt (in mg) on the electrodes Ipt1=400 mA/mg Pt

Example 4

A Vulcan Carbon supported catalyst was prepared using the following procedure:

Atomic ratios (mole %) of starting ingredients is a follows: 6.2 mole % of (19.15 mole % Pt, 19.15 mole % Ru, 3.87 mole % Nb, 38.72 mole % W, 6.34 ole % Fe, 7.2 mole % Mn, 5.57 mole % Re) 93.8 mole % C A "Waring" commercial blender was charged with 15.00 g of Vuclan XC72R (Cabot Corporation, Billerinca, Mass.) and 9.118 g of ammonium tungstate (Aldrich, 32, 238–5) that had been pulverized to a dust in a small micromill (Bel-Art Products, Pequanock, N.J., # 37252-0000). The mixture was chilled in dry ice for 90 minutes. To the blender was added 20.0 g of deionized water, which had been frozen in dry ice and pulverized in the micromill. The material was mixed in the Waring blender for 2–4 minutes. The resulting uniform solid was allowed to warm slowly in a large crystallizing dish and then dried at approximately 50° C. overnight.

The material was returned to the Waring commercial blender and chilled in dry ice for 90 minutes. To the blender was added 1.028 niobium ethoxide ($Nb(C_2H_5O)_5$, Aldrich, 33 920–2) in 18.0 g in cyclohexane, frozen in dry ice and pulverized in a micromill. The material was mixed in the Waring blender for two to four minutes. The resulting uniform solid was allowed to warm slowly to room temperature in a large crystallizing dish and dried at RT for 48 hours. The product weight is 23.26 g.

7.41 grams of this material was loaded in a quartz tube (48 mm od) fitted with a glass frit, and semi-fluidized in 100 sccm He and 200 sccm of a gas mixture consisting of 10% Ar, 45% H2, and 45% $CH_4$ (methane). The sample was heated at a rate of 10 C/min to 500° C. and 1 C/min to 800° C., and allowed to soak at 800° C. for 1 hour before cooling to room temperature in flowing He. The material was purged with nitrogen gas and then transferred to an inert atmosphere drybox where it was transferred and stored in nitrogen, with a product yield of about 4.96 g.

Step 2:

A variation on the procedure from Watanabe, "M. Watanabe, M. Uchida, and S. Moto, "Preparation of Pt+Ru alloy clusters", *J. Electroanal. Chem.*, 229 (1987) 395–406 was used. Into a 5 liter stirred plastic vessel, 5.67 g of an aqueous chloroplatinic acid solution (containing 10.13 wt % Pt, derived from $H_2PtCl_6$, Sigma Aldrich Chemical Company, St. Louis, Mo.) were added along with 845 ml of water. 2.899 g of $NaHSO_3$ were added (Aldrich Chemicals) and stirred into the solution for 10 minutes. The solution pH was adjusted to 5 using sodium carbonate. 141 ml of $H_2O_2$ (30 wt % $H_2O_2$, Merck, GaA, Darmstadt Germany) were added over a period of about four minutes, with pH controlled to about 5. 14.72 g of an aqueous $RuCl_3$ solution containing 2.02 wt % Ru (derived from $RuCl_3$, Aldrich Chemical Company) were diluted in 49.27 ml of $H_2O$. 4.00 g of the material prepared in Step 2 were added to the mixture, and the mixture was stirred for 15 minutes until the pH is stabilized. The material was stirred for 10 minutes under nitrogen and then purged with approximately 100 ml/minute hydrogen gas overnight at room temperature. It was filtered and washed with 5 liters of water, followed by air drying.

Step 3:

0.100 g of the material formed in Step 2 and 0.184 g of 11.4 wt % 990 EW Nafion® solution (SE10072, hydrogen form, DuPont) and 5.727 g of $H_2O$ were mixed with 20.0 microliters of an aqueous solution containing 1M $Fe(NO_3)_3$, 45.4 microliters of an aqueous solution containing 0.44 M $Mn(NO_3)_2$, and 39.9 microliters of an aqueous solution containing 0.5 M perrhenic acid. This mixture was milled in an Omni Mixer Homogenizer at room temperature for 30 minutes. The ink was then coated onto carbon paper strips over a 1.5 $cm^2$ area so that the final of catalyst is ca. 0.3 mg Pt/1.5 $cm^2$. The electrode material was heated in hydrogen at 300° C. for 1 hour prior to testing.

Step 4: Electrochemical Evaluation

An Arbin Testing system station, manufactured by Arbin Instruments (Model BT2043, Software Version MITS'97) was used to collect the electrochemical half cell data. The electrodes were evaluated for their activity for methanol oxidation by using cyclic voltametry (CV) in a 1M $CH_3OH$/ 0.5M $H_2SO_4$ solution using a 3 electrode system where the counter electrode was a Pt coil and a SCE (Standard calomel electrode) was used as the reference electrode. The potential was scanned from the open circuit potential (Eoc) to 1.1 V and back to –0.25V at a scan rate of 50 mV/sec. The scans were repeated from 1.1V–-0.25V–1.1V until the current was stable.

The currents were normalized for geometric surface area. The current tabulated was ipt1A, which was the peak oxidation current from the CV scan normalized to the amount of Pt (in mg) on the electrodes.

Ipt1=297 mA/mg Pt.

What is claimed is:

1. An anode electrocatalyst, comprising:
   (a) compound selected from the group consisting of tungsten carbide, molybdenum carbide, tungsten oxycarbide, molybdenum oxycarbide, and mixtures thereof;
   (b) platinum, mixtures of platinum and ruthenium, or mixtures of platinum and ruthenium oxide; and
   (c) a metal selected from the group consisting of V, Nb, Ta, Cr, Mn, Fe, Re, Co, Ni, Cu, and mixtures thereof; wherein component (a) is present in the amount of about 5 to about 99.989995 mole %, component (b) is present in the amount of about $5\times10^{-6}$ to about 70 mole %, and component (c), is present in the amount of about 0.01 to about 69.999995 mole %, where the mole percentages are calculated based on the total metals content.

2. The anode electrocatalyst of claim 1 wherein component (a) is present in the amount of about 30 to about 99.989995 mole %, component (b) is present in the amount of about $5\times10^{-6}$ to about 50 mole %, and component (c), is present in the amount of about 0.01 to about 49.999995 mole %, where the mole percentages are calculated based on the total metals content.

3. A coated substrate comprising substrate having coated thereon an electrocatalyst coating composition, wherein the electrocatalyst coating composition comprises an anode electrocatalyst comprising:
   (a) compound selected from the group consisting of tungsten carbide, molybdenum carbide, tungsten oxycarbide, molybdenum oxycarbide, and mixtures thereof;
   (b) platinum, mixtures of platinum and ruthenium, or mixtures of platinum and ruthenium oxide; and
   (c) a metal selected from the group consisting of V, Nb, Ta, Cr, Mn, Fe, Re, Co, Ni, Cu, and mixtures thereof; and wherein the substrate is an ion exchange membrane.

4. The coated substrate of claim 3 wherein the ion exchange membrane is the acid form of a perfluorinated sulfonic acid polymer.

5. The coated substrate of claim 3 wherein the electrocatalyst coating composition further comprises a binder.

6. The coated substrate of claim 5 wherein the binder is an ion exchange polymer.

7. The coated substrate of claim 3 wherein the electrocatalyst coating composition further comprises a solvent.

8. The coated substrate of claim 3 wherein the anode electrocatalyst further comprises a catalyst solid support.

9. The coated substrate of claim 8 wherein the catalyst solid support is present in the amount of about 1 to about 99.9 mole, based on the total mole % of the anode electrocatalyst.

10. The coated substrate of claim 8 wherein catalyst solid support is turbostratic carbon or graphitic carbon.

11. The coated substrate of claim 3 wherein the anode electrocatalyst comprises component (a) present in the amount of about 5 to about 99.989995 mole %, component (b) present in the amount of about $5\times10^{-6}$ to about 70 mole %, and component (c), present in the amount of about 0.01 to about 69.999995 mole %, where the mole percentages are calculated based on the total metals content.

12. The coated substrate of claim 11 wherein the anode electrocatalyst comprises component (a) present in the amount of about 30 to about 99.989995 mole %, component (b) present in the amount of about $5\times10^{-6}$ to about 50 mole %, and component (c), present in the amount of about 0.01 to about 49.999995 mole %, where the mole percentages are calculated based on the total metals content.

13. A fuel cell comprising coated substrate, wherein the coated substrate comprises a substrate having coated thereon an electrocatalyst coating composition, wherein the electrocatalyst coating composition comprises an anode electrocatalyst comprising:
   (a) compound selected from the group consisting of tungsten carbide, molybdenum carbide; tungsten oxycarbide, molybdenum oxycarbide, and mixtures thereof;
   (b) platinum, mixtures of platinum and ruthenium, or mixtures of platinum and ruthenium oxide; and
   (c) a metal selected from the ground consisting of V, Nb, Ta, Cr, Mn, Fe, Re, Co, Ni, Cu, and mixtures thereof; wherein the substrate is an ion exchange membrane.

14. The fuel cell of claim 13 wherein the ion exchange membrane is the acid form of the perfluorinated sulfonic acid polymer.

15. The anode electrocatalyst of claim 1 further comprising a catalyst solid support.

16. The anode electrocatalyst of claim 15 wherein catalyst solid support is turbostratic carbon or graphitic carbon.

* * * * *